United States Patent [19]

Mayer

[11] 4,157,185

[45] Jun. 5, 1979

[54] AUTOMATICALLY RESETTABLE TOY PHONOGRAPH ASSEMBLY

[76] Inventor: Richard J. Mayer, 790 Smith Rd., Parsippany, N.J. 07054

[21] Appl. No.: 914,038

[22] Filed: Jun. 9, 1978

[51] Int. Cl.² .................. G11B 17/06; A63H 3/33
[52] U.S. Cl. .................. 274/1 A; 274/15 R; 274/1 L
[58] Field of Search .................. 274/1 A, 15 R, 1 L

[56] References Cited

U.S. PATENT DOCUMENTS

| | | | |
|---|---|---|---|
| 1,249,251 | 12/1917 | Turnquist | 274/15 R |
| 3,030,114 | 4/1962 | Jauquet | 274/15 R |
| 3,544,115 | 12/1970 | Licitis | 274/1 A |
| 3,709,505 | 1/1973 | Ashmele | 274/1 A |
| 3,721,449 | 3/1973 | Sirinek | 274/1 A |
| 4,027,887 | 6/1977 | Watanabe | 274/1 A |

Primary Examiner—Richard E. Aegerter
Assistant Examiner—John W. Shepperd

[57] ABSTRACT

A motorized toy phonograph assembly having a housing comprising in combination; a speaker cone subassembly in which a speaker cone is mounted, a motor subassembly in which a DC motor is mounted and a turntable subassembly in which a turntable is mounted with a phonograph record thereon, an intermediate wall separating the speaker cone subassembly from the turntable subassembly and having a predetermined opening for a tonearm pivotally connected to the housing in a biased position between the phonograph record and the speaker cone. The turntable is secured to a fixed shaft movable within a slot in the intermediate wall. Cam means tilt the turntable into various inclined positions for resetting the phonograph record upon completion of the record message.

9 Claims, 5 Drawing Figures

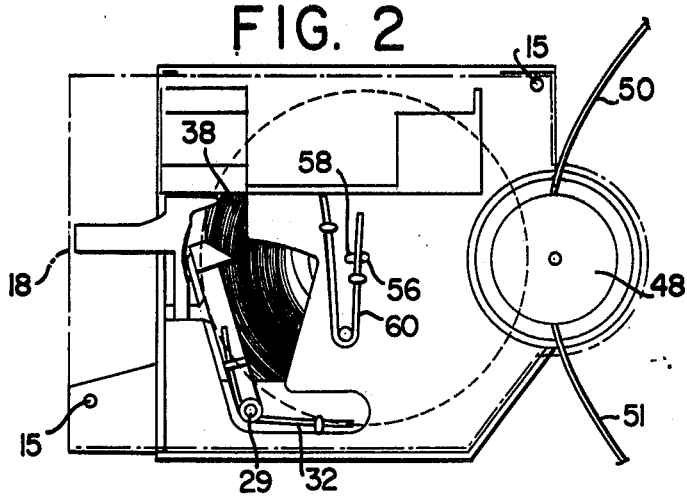
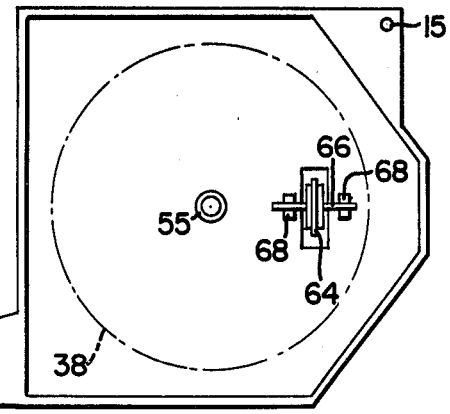
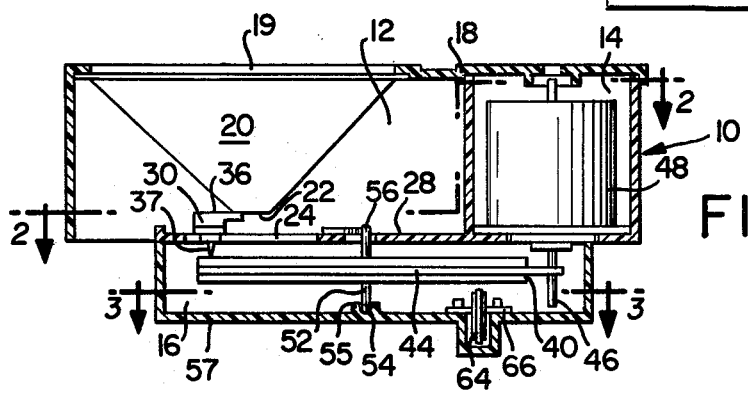
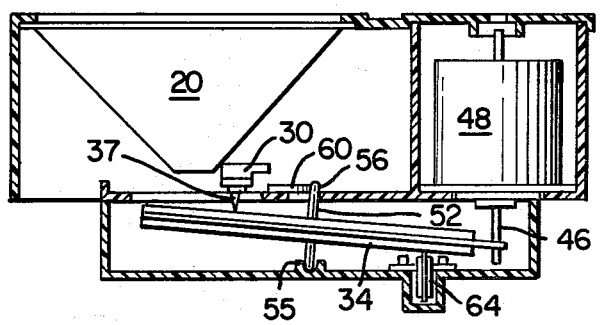
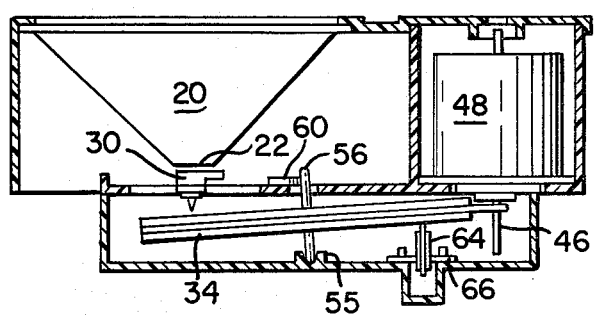

AUTOMATICALLY RESETTABLE TOY PHONOGRAPH ASSEMBLY

This invention relates to a toy phonograph assembly and more particularly to a motorized toy phonograph assembly which is automatically resettable.

A particularly desirable feature of a motorized toy phonograph is the ability to receive repeated transmission of the record message without intervention by the user. Although automatically resettable toy phonograph assemblies are commercially available, the resettable mechanism operates, in general, by forcing the stylus back to the starting position across the record. This inevitably scratches and damages the record. Other known mechanisms operate in a fashion similar to a conventional automatic phonograph by lifting and returning the tonearm back to its starting position on the record. Such a design by its very nature is far too costly and complex for use in a simple toy device. The construction of the assembly for use in a practical toy must be relatively inexpensive and sufficiently reliable to withstand the degree of abuse to which a toy is, in general, prone to receive.

Accordingly, it is the principal object of the present invention to provide an automatically resettable phonograph assembly which is inexpensive in construction, easy to assemble and highly reliable.

The present invention provides an automatically resettable phonograph assembly which comprises: a housing; a rotatable turntable mounted in said housing for rotation in a first position; a phonograph record mounted upon said turntable for rotation therewith, said record having at least one spiral groove formed therein with a starting position substantially at the periphery thereof and a predetermined terminal position; a tonearm located above said turntable and being pivotally connected at one end to said housing; a stylus connected to another end of said tonearm and adapted to engage said spiral groove; spring means for biasing the stylus end of said tonearm into said starting position; a speaker cone mounted on said housing above said tonearm with one end thereof adapted to contact said tonearm over a predetermined portion of said record extending from said starting position to said terminal position; a motor having a drive shaft; an endless belt entrained about said drive shaft and said turntable for rotating said turntable in response to the energization of said motor; means for pivotally urging said turntable against said stylus such that when said stylus reaches said predetermined terminal position said turntable is tilted into a predetermined inclined position relative to said first position; and means engaging said turntable in said predetermined inclined position for initially tilting said turntable past said first position and into another inclined position so as to disengage said turntable from said tonearm thereby automatically returning said tonearm to said starting position and then repositioning said turntable into said first position.

Other objects and advantages of the present invention will become apparent from the following detailed description of the invention when read in conjunction with the accompanying drawings of which:

FIG. 1 is a side elevation of the toy phonograph assembly of the present invention shown in cross-section;

FIG. 2 is a plan view of the toy phonograph assembly of the present invention taken along the lines 2—2 of FIG. 1;

FIG. 3 is another plan view of the toy phonograph assembly of the present invention taken along the lines 3—3 of FIG. 1;

FIG. 4 is another side elevation of the toy phonograph assembly of the present invention similar to that shown in FIG. 1 with the turntable tilted into an inclined position relative to the position of the turntable in FIG. 1; and FIG. 5 is yet another side elevation of the toy phonograph assembly of the present invention similar to FIGS. 1 and 4 with the turntable tilted into another position past the turntable position of FIG. 4 and with the tonearm shown moving back to its initial starting position for repeating the record message.

Referring now to FIGS. 1, 2 and 3 inclusive in which the toy phonograph assembly of the present invention is shown comprising a housing 10 including, in combination, a speaker cone subassembly 12, a motor subassembly 14 and a turntable subassembly 16. Each of the subassemblies 12, 14 and 16 are detachably connected together through mounting screws (not shown) inserted into holes 15.

The speaker cone subassembly 12 includes a top cover 18 having a speaker grille 19 secured to a conventional speaker cone 20 along a peripheral edge on the loudspeaker side thereof. The speaker cone 20 is preferably of a frusto-conical geometry having a relatively flat base 22. The flat base is located above an open section 24 formed in the intermediate wall 28 of the subassembly 12 of housing 10. A tonearm 26 is pivotally secured at one end to a post 29 protruding from the wall 28. The tonearm 26 supports a stylus 30 at its opposite end and is adapted to traverse a path about said open section 24. A tension spring 32 is mounted about the post 29 in biased engagement with the tonearm 26 for applying a continuous force upon the tonearm 26 to rotatably urge it toward a predetermined starting position with the stylus 30 abutting the flat base 22 of the speaker cone 20. The open section 24 of the wall 30 allows the tonearm 26 to move in a plane parallel to the flat base 22 and provides clearance for the tonearm 26 to be lifted in response to the tilting of the turntable 34 as will be hereafter explained in greater detail. The stylus 30 has an upper surface 36 which preferably conforms in geometry to the flat base 22 for establishing intimate surface contact between the stylus 30 and the speaker cone 20.

A phonograph needle 37 extends from the stylus 30 for making contact with a phonograph record 38 mounted on the turntable 34 within the turntable subassembly 16. The phonograph record 38 is preferably a conventional plastic disk having a plurality of spiral grooves formed thereon for forming a conventional sound track representing the record message to be transmitted through the speaker cone 20. The record 38 is detachably secured to the turntable 34 for rotation in unison. The turntable 34 has an annular groove 40 about its periphery upon which is fitted an endless belt 44, such as a conventional rubberband. The belt 44 is also connected for rotation to a shaft 46 of a DC motor 48. The DC motor 48 receives power through electrical leads 50 and 51 from a source of DC voltage such as a battery (not shown).

The turntable 34 is secured about a shaft 52 which extends on opposite sides from the center of the turntable 34. The lower end 54 of the shaft 52 is seated in a well 55 formed in the bottom wall 57 of the housing 10. The well 55 permits rotation of the shaft 52 about its longitudinal axis and permits a certain degree of freedom for the shaft to be deflected into an inclined position relative to the position of the well 55. The upper end 56 of the shaft 52 extends through an elongated slot 58 formed in the intermediate wall 28 between the speaker cone subassembly 12 and the turntable subassembly 16. An auxiliary spring member 60 is secured to the wall 28 in a position biased against the upper end 56 of shaft 52 for urging the shaft 52 toward an inclined position so as to bias the turntable 34 against the stylus 30 of the tonearm 26. However, notwithstanding the auxiliary spring member 60, the shaft 52 having a relatively free upper end 56 will develop a torque in response to the lateral force applied by the endless belt 44 upon the turntable 34 which will in turn keep the phonograph record 38, the stylus 30 and the speaker cone 20 in firm engagement relative to one another.

A cam 64 of circular geometry has an off center shaft 66 rotatably mounted in eyelets 68 which extend from the bottom wall 57 of housing 10. The cam 64 projects into the turntable subassembly 16 on a side 180 degrees from the side adjacent the flat base 22 of the speaker cone 20.

The operation of the phonograph assembly is best understood by viewing FIGS. 1-3 in connection with FIGS. 4 and 5. The stylus 30 is shown in its starting position in FIG. 1 with the phonograph needle 37 in contact with the record 38 at its outer periphery. The stylus 30 is held in tight engagement between the turntable 34 and the speaker cone 20 by the rotatable force generated by the turntable 34 in response to the forces on the shaft 52. When the upper surface 36 of stylus 30 is no longer in engagement with the flat base 22 of the speaker cone 20, representing a predetermined terminal position on the record 38, the turntable 34 is tilted upward into an inclined position until contact is made between the turntable 34 and the cam 64 as shown specifically in FIG. 4. Upon contacting the cam 64, the turntable position is readjusted following a see-saw pattern until the turntable 34 is returned to the position of FIG. 1 and disengaged from the cam 64. The cam 64 causes the turntable to tilt in a direction away from the initially tilted direction passing the position of FIG. 1 until the cam 64 reaches its highest point as shown in FIG. 5. In this position enough distance exists between the turntable 34 and the flat base 22 for the stylus 30 to be retracted by the spring 32 force on the tonearm 26. Further rotation repositions the turntable and cam back to the starting position of FIG. 1.

What is claimed is:

1. An automatically resettable phonograph assembly comprising:
    a housing;
    a rotatable turntable mounted in said housing for rotation in a first position;
    a phonograph record mounted upon said turntable for rotation therewith, said record having at least one spiral groove formed therein with a starting position substantially at the periphery thereof and a predetermined terminal position;
    a tonearm located above said turntable and being pivotally connected at one end to said housing;
    a stylus connected to another end of said tonearm and adapted to engage said spiral groove;
    spring means for biasing the stylus end of said tonearm into said starting position;
    a speaker cone mounted on said housing above said tonearm with one end thereof adapted to contact said tonearm over a predetermined portion of said record extending from said starting position to said terminal position;
    a motor having a drive shaft;
    an endless belt entrained about said drive shaft and said turntable for rotating said turntable in response to the energization of said motor;
    means for pivotally urging said turntable against said stylus such that when said stylus reaches said predetermined terminal position said turntable is tilted into a predetermined second position relative to said first position; and
    means engaging said turntable in said predetermined second position for initially tilting said turntable past said first position and into a third predetermined inclined position so as to disengage said turntable from said tonearm thereby automatically returning said tonearm to said starting position and then repositioning said turntable into said first position.

2. A phonograph assembly as defined in claim 1 wherein said housing includes in combination; a speaker cone subassembly, in which said speaker cone is mounted; a motor subassembly in which said motor is mounted; a turntable subassembly in which said turntable is mounted and an intermediate wall of said housing separating said turntable subassembly from said speaker cone subassembly with said intermediate wall having a predetermined opening about which said tonearm traverses.

3. A phonograph assembly as defined in claim 2 wherein said turntable has a centrally disposed shaft with the lower end thereof flexibly connected to a bottom wall of said turntable subassembly and with its upper end extending through an elongated slot formed within said intermediate wall.

4. A phonograph assembly as defined in claim 3 wherein said flexible connection is formed by seating said lower end in a well formed in said bottom wall.

5. A phonograph assembly as defined in claim 3 further comprising auxiliary spring means mounted upon said intermediate wall for biasing said upper end of said shaft within said slot.

6. A phonograph assembly as defined in claim 5 further comprising cam means eccentrically mounted on said bottom wall for engaging said turntable in said second inclined position and for retilting said turntable to said third position and back to said first position.

7. A phonograph assembly as defined in claim 6 wherein said cam means has a circular geometry with an off-center shaft mounted to eyelet means extending from said bottom wall.

8. A phonograph assembly as defined in claim 6 wherein said speaker cone has a frusto-conical geometry with a flat base adapted to contact said stylus.

9. A phonograph assembly as defined in claim 8 wherein said stylus has an upper planar surface for engaging said flat base.

* * * * *